D. McNABB.
Wheel-Cultivator.
No. 45,730.
Patented Jan. 3, 1865.
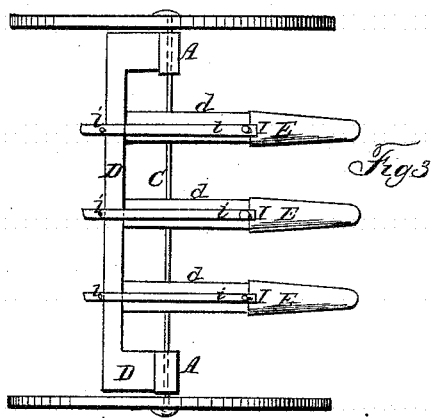
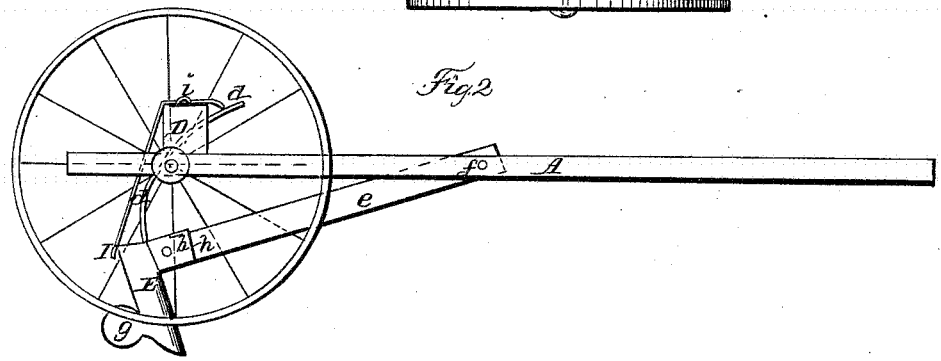
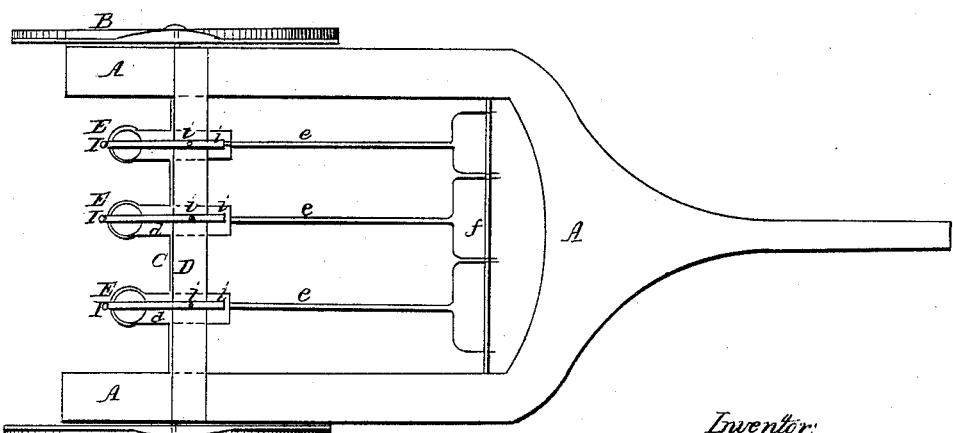

UNITED STATES PATENT OFFICE.

DANIEL McNABB, OF MOSCOW, MICHIGAN.

IMPROVEMENT IN CULTIVATORS.

Specification forming part of Letters Patent No. 45,730, dated January 3, 1865.

*To all whom it may concern:*

Be it known that I, DANIEL McNABB, of Moscow, Hillsdale county, and State of Michigan, have invented a new and useful Improvement in Seed-Drills and Cultivators; and I do hereby declare that the following is a full and exact description thereof, reference being had to the accompanying drawings, and to the letters of reference marked thereon.

The nature of my invention consists in so constructing and arranging the drill or cultivator tooth and the parts connected therewith that it will pass any obstruction which may lie in its path, with facility and without injury to the machine.

To enable others skilled in the art to make and use my invention, I will proceed to describe its construction and operation.

In the drawings, Figure 1 represents a top view of the machine. Fig. 2 represents a vertical longitudinal section, and Fig. 3 a view of the back end.

The same letters refer to the same parts of the machine in the different figures.

A is the frame; B, the wheels; D, a cross-piece of timber securely fastened upon the top of the frame. This cross-piece is cut away on the under side, as seen in Fig. 3.

C is the axle of the machine.

E represents the drill or cultivator tooth, with a loop, I, on the top outer edge, from which the tooth is suspended by a strap or chain which passes over hooks on the top of the cross-piece D. The strap has a number of holes to allow the tooth to be raised or lowered by using a different hole in the strap or link in the chain. To the inner side of the tooth (as it stands in the machine) is attached a plate or a rod of iron, and which forms a part of the tooth. This plate or rod is curved, and when the drill or cultivator is in motion it bears against the axle or against a cross-piece which may be provided for it.

$o$ is a wing attached to the lower part of the tooth and projecting inward.

$e$ is a bar attached to the wing $o$ at $h$ by a loose joint, and is loosely attached to the cross-bar $f$ at the other end. The bar $e$ at this end is attached by a crotch-connection, and has a double bearing for the purpose of steadying the tooth, as seen in Fig. 1.

When the drill or cultivator is in motion and the tooth is obstructed by a stone or otherwise the curved portion of the tooth is bearing against the axle or other cross-piece provided for it, and the form of the curve and the position of the tooth in relation to the point of said bearing will determine the amount of resistance which it may overcome without being raised out of the ground, the tooth being lowered or raised as occasion requires.

$g$ is a roller attached to the tooth, and which follows it to cover the seed when used as a drill. When so used the seed-box is placed upon the frame at A A, behind the cross-piece D, with the pliable tubes for conducting the seed into the hollow teeth in the usual manner. When used as a cultivator both the roller and seed-box are removed, if desirable.

What I claim as my invention, and desire to secure by Letters Patent, is—

Constructing a cultivator or drill tooth with an upper curved portion, which curved part shall have a bearing against some rigid portion of the machine when it is in motion, so that the form of such curved portion of the tooth and the position of the tooth shall determine the amount of resistance which it may overcome without its being raised from the ground.

DANIEL McNABB.

Witnesses:
H. N. ROWLEY,
DANIEL ROWLEY.